Aug. 9, 1949.  W. A. JOHNSTON ET AL  2,478,196
HAND TRUCK WITH POSITIONING CONTROLS
FOR LOAD HANDLING HOOKS
Filed Nov. 21, 1946  3 Sheets-Sheet 1
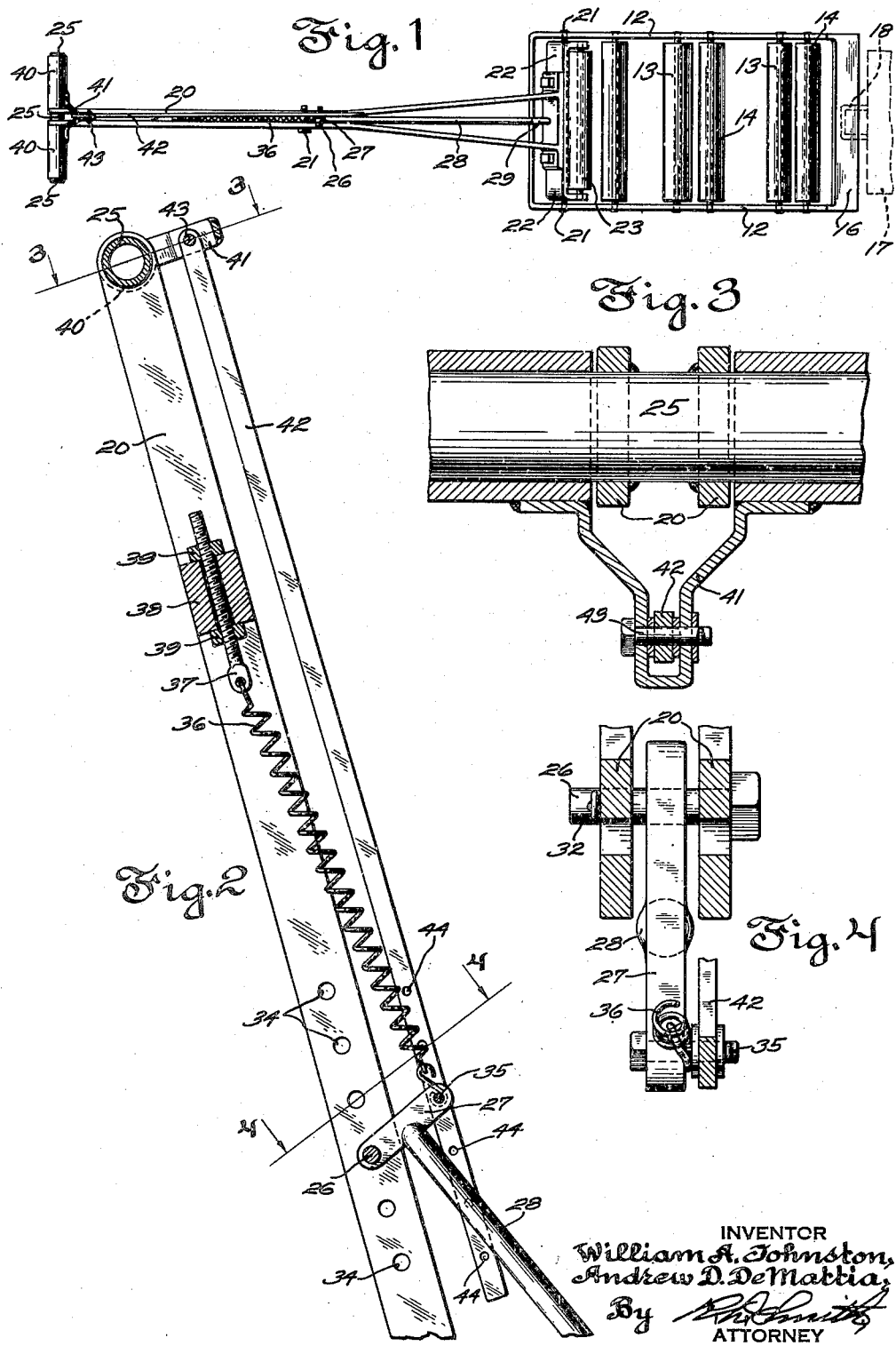
INVENTOR
William A. Johnston,
Andrew D. DeMattia,
By
ATTORNEY

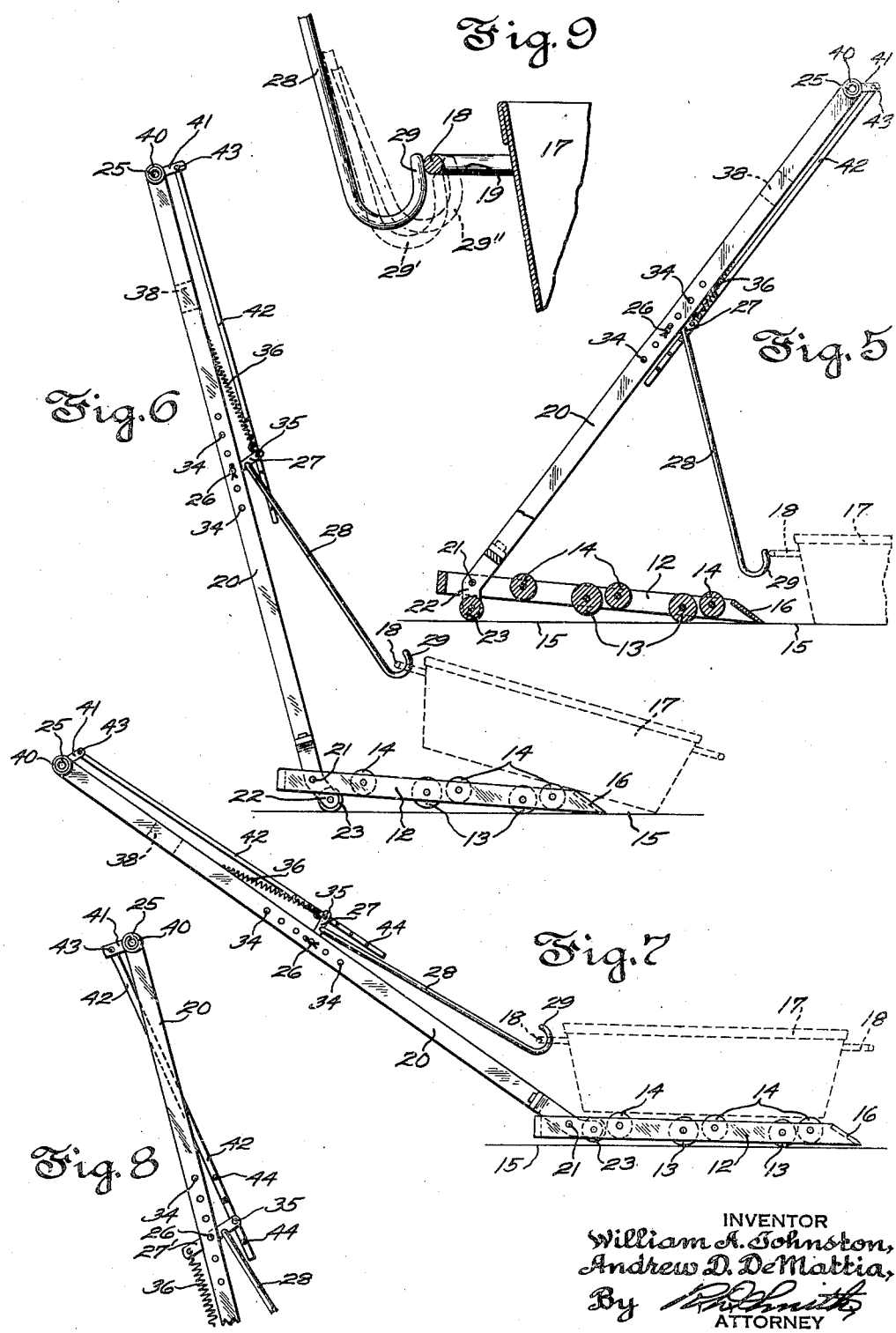

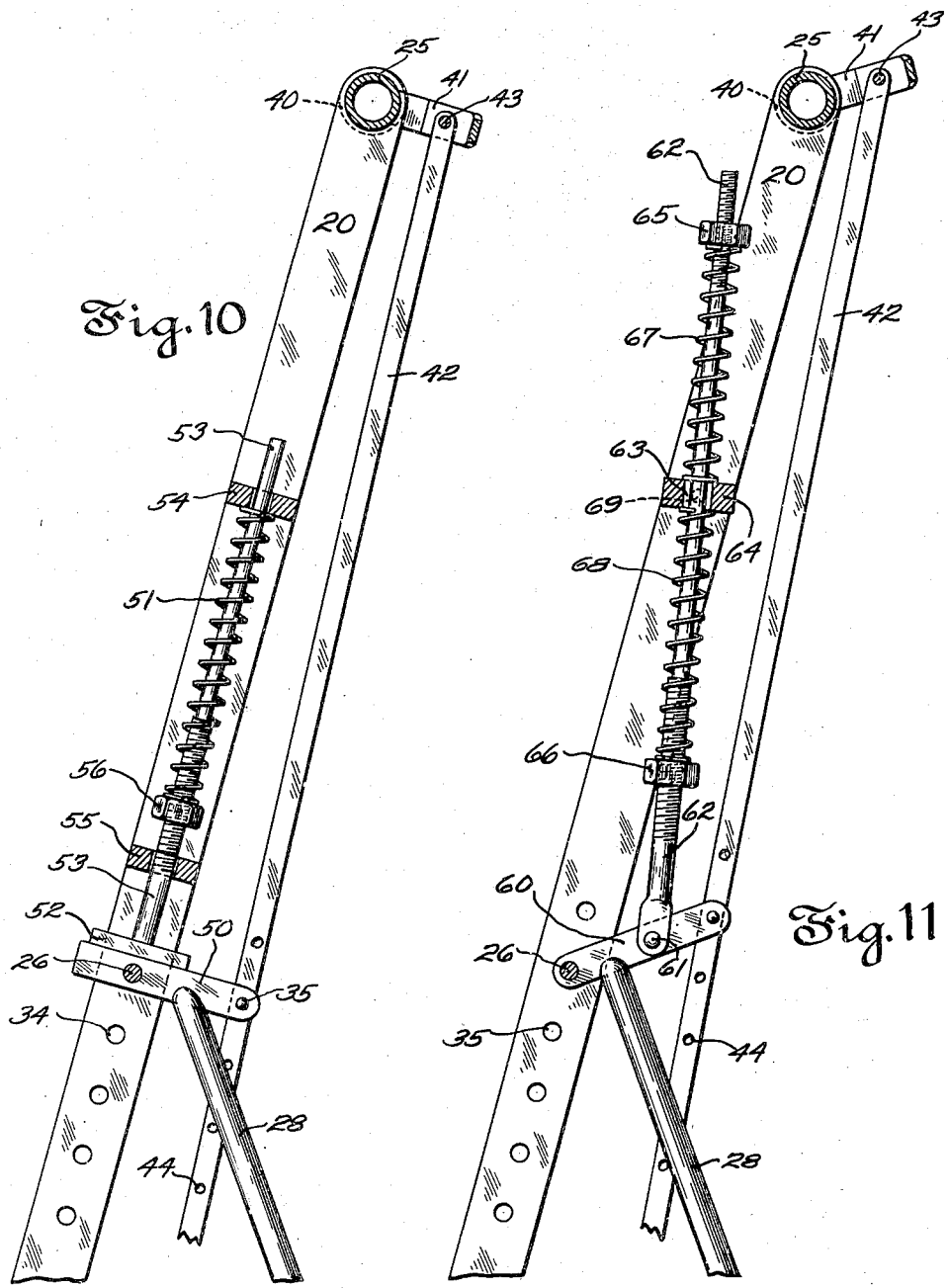

Patented Aug. 9, 1949

2,478,196

UNITED STATES PATENT OFFICE 2,478,196

HAND TRUCK WITH POSITIONING CONTROLS FOR LOAD HANDLING HOOKS

William A. Johnston, Stratford, and Andrew D. De Mattia, Fairfield, Conn., assignors to Rolock, Incorporated, Fairfield, Conn., a corporation of Connecticut Application November 21, 1946, Serial No. 711,402

19 Claims. (Cl. 214—65.4)

1

This invention relates to improvements in hand trucks of the type shown in a copending application Serial No. 680,152, filed June 28, 1946, owned by the assignee of the present application.

In said copending application an apertured handle that is fixed on or hinged to the outside vertical front face of a tote pan comprising a transportable load, is designed to be engaged by a hook that it pivotally mounted on the swingable tow bar of the truck. Such hook after being engaged with the handle serves to pull the tote pan or load upward and forwardly onto the truck as a result of merely swinging the tow bar relatively to the truck chassis.

The load engaging hook in said copending application is carried at the end of a stiff hook arm that depends obliquely from its pivotal connection to the tow bar and is constantly counterbalanced by a weight serving as a poise so that normally with the parts at rest there is no gravity moment giving the hook arm a tendency to swing relatively to the tow bar.

An object of the present improvements is to eliminate the counterbalancing weight for the hook arm of the copending application as well as the projecting extension of the hook arm that serves as a poise beam carrying such weight.

A related object is to bias the hook arm by means of less cumbersome and better operating mechanism into predetermined angular relationships to the tow bar on which it is pivoted, the relationship preferably being such that whenever the tow bar is swung relatively to the truck chassis with uniform motion toward the load, a coupling of the hook to the handle of the tote pan automatically occurs.

A further object is to employ resilient means for biasing the hook arm as described, arranged preferably to resist yieldingly any swinging displacement of the hook arm in either direction from its normal angular relation to the tow bar.

A further object is to arrange a spring coil to be so tensioned between the hook arm and the tow bar in proportion to the gravity moment of the hook arm that suddenly reversed swinging of the tow bar away from the handle of the tote pan or other load causes the load coupled hook to dip momentarily in a manner to become automatically uncoupled from the load without requiring direct manipulation of the hook by the operator of the truck.

A still further object is to provide the operator with convenient manual means for controlling and varying the angular relation of the hook

2 arm to the tow bar through the medium of a handle carried on the tow bar within convenient reach of the operator.

A particular object is to embody in one or more swiveling handle grips a common means for not only maneuvering the truck by means of the tow bar, as well as maneuvering the tow bar in relation to the truck, but also for maneuvering the hook arm in relation to the tow bar thereby to assist in coupling or uncoupling the hook from the tote pan or other load without simultaneous use of both hands and without need of shifting the operator's hand from one handle to another.

The foregoing and other purposes of the present improvements are more particularly pointed out in the following description of a practical form of structure in which the invention may be embodied, such description having reference to the following drawings wherein:

Fig. 1 is a plan view of a hand truck embodying the present improvements.

Fig. 2 is a side elevation of the tow bar drawn on a larger scale.

Fig. 3 is a still further enlarged fragmentary view taken in section on the plane 3—3 in Fig. 2 looking in the direction of the arrows.

Fig. 4 is a fragmentary view drawn on a correspondingly enlarged scale taken in section on the plane 4—4 in Fig. 3 looking in the direction of the arrows.

Fig. 5 is a side view on the same scale as Fig. 1 showing the heel of the truck backed up into proximity to the handle carrying side of a tote pan, with the tow bar in course of being swung toward the load.

Fig. 6 shows the tow bar of Fig. 5 coupled to the tote pan and in the process of pulling it upward and forward onto the truck.

Fig. 7 shows the tote pan fully loaded on the truck and the tow bar in natural position for hauling the loaded truck along the floor.

Fig. 8 shows a modified arrangement of connections between the grip handle and the hook arm for reversing the rotary direction in which the grip handle is turned for lifting the hook.

Fig. 9 represents on a larger scale certain coupling or uncoupling movements of the hook with respect to the handle of a tote pan.

Fig. 10 shows a modified arrangement of spring means for yieldably stationing the hook arm more definitely in its normal relation to the tow bar.

Fig. 11 shows a still further modified spring construction for a similar purpose.

As in the chassis construction of the truck of the copending application hereinbefore referred to, the present truck may comprise a border frame 12 between whose side bars there are pivotally mounted a pair of traction wheels or ground rollers 13 and a series of preferably three or more platform wheels or load supporting rollers 14 projecting above the top of frame 12 and permanently elevated above the floor surface 15 on which the truck rolls. The rear or heel end of chassis frame 12 tapers and its wedge-shaped terminus 16 can be directed along the floor toward the base edge of a tote pan 17 by tilting truck frame 12. This tilting is accomplished by swinging movement of a tow bar 20 which is pivotally hinged at 21 to the front end of chassis frame 12. The swingable tow bar 20 is rigid with a yoke 22 at its lower end which carries a bodily movable third traction wheel or ground roller 23 that becomes forced to swing downward with a sort of toggle action as tow bar 20 is swung toward the load receiving or heel end of the truck thus tilting chassis frame 12 as described for lowering wedge 16 to the floor line at the base edge of the tote pan.

Tow bar 20 carries at its free end the usual rigid cross rod 25 and is equipped at a point intermediate its ends with a hinge pin 26 on which is turnably mounted the hub bar 27 of stiff hook arm 28 one of whose ends carries, or is bent to form, load engaging hook 29. This hinge pin is removable from tow bar 20 by removing its cotter pin 32 and can be reinserted selectively in different holes 34 spaced along the tow bar.

The hub bar 27 forms a spur anchorage in rigid relation to hook arm 28. The free end of this hub bar carries an anchorage stud 35 for the lower end of a lengthwise extensible and contractable spring coil 36 whose upper end is pivotally anchored to an eye bolt 37 that is longitudinally adjustable through a clearance hole in a block 38 fixed between the side irons of the tow bar 20. Nuts 39 threaded on to bolt 37 maintain its longitudinal adjustment. Spring coil 36 is long and flexible and preferably adjusted to be under such tension that it will serve to counterbalance the gravity moment of hook arm 28 in all positions to which the tow bar is swung. This gravity moment is a force tending to swing the hook arm clockwise in Figs. 2 to 7 of the drawings, the magnitude of which force varies slightly in respectively different angular inclinations of the tow bar when the hook is free from the load. This variation in force of turning moment is due to the center of gravity of the combined hook 29, hook arm 28, and hub bar 27 possessing a relatively long lever arm with relation to pivot 26 when the tow bar is swung downward to the left as in Fig. 7 which lever arm, however, approaches zero as the tow bar is swung well toward the right as in Fig. 5.

The tension in spring 36 is preferably so adjusted that it will bring the hook 29 into its relationship to the tote pan handle shown in Fig. 5 as the tow bar is swung with uniform motion backward toward the tote pan. Continued swinging of the tow bar to the right beyond its position shown in Fig. 5 will, through the extensible yielding of spring 36, cause the hook 29 to cam downward and to the right through a series of positions including the broken line positions 29' and 29" until the nose of the hook finds the opening or aperture 19 in handle 18. Thereupon the temporarily stretched spring 36 will exert its contractive tension to swing the hook arm counterclockwise and lift the hook nose abruptly upward into aperture 19 thus causing automatic coupling engagement of the hook with the tote pan handle as a mere result of swinging the tow bar toward the load and without any direct manipulation of the hook.

If it now is desired to uncouple the hook from the tote pan without directly touching any part of hook structure 27, 28, 29 an accelerated rearward swinging motion of tow bar 20 toward the right in Fig. 6 will cause hook 29 to dip momentarily into its position 29' and will at the same time build up a clockwise swinging inertia of the structure 27, 28, 29 about pivot 26 capable of overcoming the very light upward pull of spring 36. This inertia thereupon sets up a pendulum-like resistance delaying the ability of hook 29 to rise again and thus affords enough time before spring 36 can again lift the hook, to permit of abruptly reversing the swinging of the tow bar to a forward direction or toward the left in the drawings. This defeats recoupling engagement of the hook with the tote pan handle and leaves the tote pan free from the hook.

Together with, or in place of spring 36, manually operable controlling mechanism may be associated with the hub bar 27 for either causing or preventing swinging movement of hook arm 28 relatively to tow bar 20. One extremely simple and convenient form of such mechanism for manually operating the hook arm may consist of hollow grip handles 40 mutually united in rigid relationship by a yoked crank arm 41 and mounted to swivel freely in unison upon the rigid cross rod 25 of the tow bar. A stiff link 42 is pivotally connected at its upper end 43 to the crank arm 41 and contains near its lower end a series of spaced pivot holes 44, any chosen one of which may be pivotally engaged with the stud 35 in hub bar 27 of the hook arm. Thus a parallelogram of motion will be performed by crank 41, link 42 and hub bar 27 under control of the grip handles 40, whether or not spring 36 is present to exert a balancing bias on the hook arm. Such one of the pivot holes 44 will be chosen for coupling to hub bar 27 as accords with the hole 34 in tow bar 20 serving as pivot for the hub bar 27.

In Figs. 2 and 5 to 7, swiveling of the grip handles 40 in a counterclockwise direction is necessary for lifting hook 29. If these grip handles are grasped by the operator and kept from turning in the operator's hand as the tow bar is swung forward, or toward the left and downward, from its position in Fig. 5 to its position in Fig. 7 then a relative turning of the grip handles 40 relative to the tow bar will occur in a clockwise direction and this would tend to lower the hook 29 out of its coupled engagement with the toe pan handle 18. This is particularly true if the grip handles are seized by an overhand grasp. However, by a simple change in the hook-up of link 42, this turning tendency of the grip handles relatively to the tow bar may be reversed as to its rotary direction and converted into a tendency to lift hook 29 and keep it even more positively in coupled engagement with the tow bar handle than spring 36 alone might do. This modified arrangement is shown in Fig. 8 wherein the hook-up is so changed that the crank arm 41 is displaced roughly 180 degrees from its position in Figs. 5 to 7 when linked to the hub bar 27 thus causing link 42 to cross between the side irons of the tow bar and cross through the tow bar in extending from crank 41 to the hub bar 27.

In order to make room for this modified hook-up of link 42, Fig. 8 shows the block 38 omitted from the space between the sides of the tow bar. It may be fixed to the tow bar outside such space or instead, link 42 may cross the tow bar in a location outside such space permitting block 38 to remain therein.

Fig. 8 shows as an alternative to the extension of spring 36 in a direction above the hub bar 27, the extension of an equivalent spring 36 in a direction below the hub bar 27' the latter being modified to project to the opposite side of the tow bar from the pivot stud 35 of link 42. Spring 36 in Fig. 8 may be anchored to tow bar 20 at a relatively low point by the same kind of adjustable means 37—39 that is shown in Fig. 2.

Since as hereinbefore stated a function of spring coil 36 is to push as well as pull on hub bar 27 for yieldingly resisting the rise of hook 29 above its normal position shown in Fig. 5, the dependability of this spring coil in so functioning can be assisted by a stiff core rod free to slide within and lengthwise of spring 36.

An example of one such construction is shown in Fig. 10 wherein the hub bar 50 is a modified version of hub bar 27 serving as a rocking beam urged resiliently by spring 51 and the pressor foot 52 into its definite neutral position shown in the drawing. The stiff stem 53 of pressor foot 52 is rigid therewith and is freely slidable through holes in the two spaced bearing blocks 54 and 55 fixed on tow bar 20. Spring coil 51 is under constant axial compression between bearing block 54 and a thrust collar or nut 56 having threaded engagement with stem 53 for adjusting the spring tension, while this coil is otherwise loose with respect to stem 53. Hook arm 28, of course, remains rigid with hub bar 50 whereby any force tending to change the angular relation of hook arm 28 to the tow bar must cause rocking of hub bar upon its pivot 26 which will be resisted yieldingly in either direction by the tension in spring 51 inasmuch as any such movement must lift pressor foot 52.

A further modification of spring mechanism for positioning and normally maintaining the hook arm 28 in definite angular relation to tow bar 20 is illustrated in Fig. 11, wherein hub bar 60 is shown to carry fixedly a hinge stud 61 on which there is free to pivot the lower looped end of a stiff guide rod 62 having swingable as well as a slidable engagement with an oversized hole 63 in bearing block 64 fixed on tow bar 20. Rod 62 carries fixed thereon two thrust collars or nuts 65 and 66 each having threaded engagement with rod 62 for adjusting the tension springs which thrust against them. A spring coil 67 fills the entire axial distance between collar 66 and block 64. Another spring coil 68 fills the entire axial distance between collar 67 and block 64. Otherwise the convolutions of springs 67 and 68 are loose with respect to rod 62. Any force tending to change the angular relation of hook arm 28 to the tow bar will be resisted yieldingly by one or the other of springs 67 and 68. If preferred, the rod 62 may be made a smooth sliding fit in block 64 rather than making the bearing hole 63 oversize. In this case the block 64 itself will be pivoted on the tow bar to be swingable upon a fulcrum 69 rather than fixed to the tow bar.

The appended claims are directed to and intended to cover not only the specific constructions and arrangements of parts herein illustrated and described but also all substitutes for and equivalents thereof which are fairly embraced within the definitions of the claims.

We claim:

1. A hand truck for taking on and/or discharging loads without manual handling of the load, including the combination with a truck chassis and a swingable tow bar hinged thereon, of a load maneuvering device constructed and arranged to be self coupling to the load comprising a stiff arm pivotally connected near one of its ends to said bar and carrying at its other end a hook shaped and disposed to be engageable with the load, together with resilient means reactive between said arm and said tow bar in a manner yieldably to poise the said hook in normal predetermined relationship to said tow bar such that said hook is movable into coupled engagement with the load by swinging movement of said tow bar relative to said chassis.

2. A hand truck as defined in claim 1, in which the said resilient means comprises spring structure constructed and arranged yieldingly to resist swinging displacement of the said hook arm in both directions from its said normal angular relationship to the said tow bar.

3. A hand truck as defined in claim 1, in which the said resilient means includes a spring so operatively related to the said hook arm that the said hook is positioned automatically by said resilient means in predetermined relation to a load when the truck is backed up to the load and said tow bar is swung toward the load.

4. A hand truck as defined in claim 1, together with a spur anchorage on the said hook arm engaged by the said resilient means.

5. A hand truck as defined in claim 1, in which the said resilient means is anchored to the said tow bar and is operatively connected to said hook arm in a manner both to swing said hook arm in a direction to lift said hook into coupled engagement with the said load and also to permit said hook to dip with respect to the tow bar and load during approach to its said coupled engagement.

6. A hand truck as defined in claim 1, in which the said resilient means includes an axially extensible and axially contractable spring coil connected at one of its ends to the said tow bar and connected at its other end to the said hook arm, the tension in said spring coil being so light in proportion to the gravity moment of said hook arm that suddenly reversed flinging of said tow bar away from the said load causes said hook to dip momentarily in a manner to become uncoupled automatically from the load without direct manipulation of the hook arm.

7. A hand truck for taking on and/or discharging loads without manual handling of the load, including the combination with a wheeled truck chassis for transporting the load and a tow bar hinged thereon in a manner to swing about an axis directed crosswise of said tow bar, of a grip handle mounted on said tow bar in a manner to swivel about a different axis directed crosswise of the tow bar, a load engaging device mounted on said tow bar in a manner to swing relatively thereto, and means constructed and arranged to transmit rotary motion from said grip handle to said load engaging device for moving the latter relatively to said tow bar and to the load.

8. A hand truck as defined in claim 7, in which the said rotary motion transmitting means comprises a stiff link extending between and pivotally connected to the said grip handle and to the said load engaging device.

9. A hand truck as defined in claim 7, in which both the said grip handle and the said load engaging device have crank arms, and the said rotary motion transmitting means comprises a stiff link extending between and pivotally connected to the said grip handle and to the said load engaging device.

10. A hand truck as defined in claim 7, in which the said grip handle is tubular, together with a cross rod rigidly fixed on the said tow bar on which the said grip handle is mounted in a manner to swivel about the axis of said cross rod.

11. A hand truck as defined in claim 7, in which the said load engaging device comprises a hook arm, together with means pivotally coupling said hook arm to the said tow bar at various points lengthwise of the latter, the said rotary motion transmitting means comprising a link a portion of whose length operatively connects the said grip handle with said hook arm, together with means to vary the effective length of said link portion in accordance with said various points at which said hook arm may be pivotally coupled to said tow bar.

12. A hand truck as defined in claim 7, in which the said load engaging device comprises a hook arm, together with pivotal connections on said tow bar displaceable to chosen spaced points therealong, the said rotary motion transmitting means comprising a link and pivotal connections on said link displaceable to chosen spaced points therealong corresponding respectively to said chosen spaced points along said tow bar.

13. A hand truck as defined in claim 7, in which the said load engaging device comprises a hook arm, the said tow bar having a series of holes spaced lengthwise thereof for pivotal attachment of said hook arm to said tow bar at chosen points in the length of the latter, the said rotary motion transmitting means comprising a link having a series of holes spaced lengthwise thereof for pivotal attachment to said hook arm of chosen points in the length of said link.

14. In a load transporting hand truck having a swingable tow bar, mechanism for maneuvering the load by swinging movement of said tow bar comprising a hook arm pivotally coupled to said tow bar, a spur on said hook arm, a handle movably mounted on said tow bar and a link connecting said spur and said handle.

15. In a load transporting hand truck having a swingable tow bar, mechanism as defined in claim 14, in which the said handle is mounted to swivel about an axis extending crosswise of the tow bar.

16. In a load transporting hand truck having a swingable tow bar, mechanism as defined in claim 14, in which the said handle comprises two axially spaced coaxial tubular grips on respectively opposite sides of said tow united to turn in unison, together with pintles fixed to and projecting on respectively opposite sides of said tow bar rotatably supporting said tubular grips.

17. In a load transporting hand truck having a swingable tow bar, mechanism as defined in claim 14, in which the said handle comprises two axially spaced tubular grips on respectively opposite sides of the said tow bar, and a crank arm to which the said link is connected constructed to bridge said tow bar and unite said grips in rigid relationship, together with pintles fixed to and projecting on respectively opposite sides of said tow bar rotatably supporting said tubular grips and crank arm.

18. A hand truck as defined in claim 1, together with a handle movably mounted on said tow bar, and means constructed and arranged to transmit rotary motion from said handle to the said arm of the said hook.

19. A hand truck as defined in claim 1, together with a grip handle mounted on the said tow bar in a manner to swivel about an axis directed crosswise thereof, and a stiff link connecting said handle and the said arm of the said hook in a manner to transmit rotary motion from the former to the latter.

WILLIAM A. JOHNSTON.
ANDREW D. DE MATTIA.

REFERENCES CITED

The following references are of record in the file of this patent:

UNITED STATES PATENTS

| Number | Name | Date |
| --- | --- | --- |
| 771,804 | Blomquist | Oct. 11, 1904 |
| 2,360,799 | Slingsby | Oct. 17, 1944 |
| 2,367,754 | Cole | Jan. 23, 1945 |

FOREIGN PATENTS

| Number | Country | Date |
| --- | --- | --- |
| 177,446 | Switzerland | May 31, 1935 |
| 783,825 | France | Apr. 15, 1935 |